(12) United States Patent
Sandy

(10) Patent No.: US 8,851,417 B2
(45) Date of Patent: Oct. 7, 2014

(54) SELF-RETAINING SHEAR PIN FOR BLIND MOUNT LOCATION

(75) Inventor: David F. Sandy, Milford, CT (US)

(73) Assignee: United Technologies Corporation, Hartford, CT (US)

( * ) Notice: Subject to any disclaimer, the term of this patent is extended or adjusted under 35 U.S.C. 154(b) by 214 days.

(21) Appl. No.: 13/568,199

(22) Filed: Aug. 7, 2012

(65) Prior Publication Data

US 2014/0042268 A1 Feb. 13, 2014

(51) Int. Cl.
  *B64D 27/10* (2006.01)
(52) U.S. Cl.
  USPC ............... 244/54; 248/554; 60/796; 403/131
(58) Field of Classification Search
  USPC ....... 244/54; 248/554–557; 403/131; 60/767, 60/797; 411/353, 383
  See application file for complete search history.

(56) References Cited

U.S. PATENT DOCUMENTS

| 4,943,013 A * | 7/1990 | Kapala et al. .................... 244/54 |
| 2008/0156930 A1 | 7/2008 | Audart-Noel et al. |

* cited by examiner

*Primary Examiner* — Timothy D Collins
*Assistant Examiner* — Nicholas McFall
(74) *Attorney, Agent, or Firm* — Carlson, Gaskey & Olds, PC

(57) ABSTRACT

A shear pin connection for use in a difficult to access location has a bolt head to be positioned at an inner end of a bearing. A bushing is received between the bolt and an inner periphery of the bearing. A lock member is positioned between an inner end of the bushing and the bolt head. The lock member is radially expandable, and has a free radially outer dimension that is smaller than an inner dimension of the inner bore. The lock member is expandable to have an expanded radially outer dimension that is greater than the inner dimension of the inner bore. A nut is tightened on the outer end of the bolt. The nut causes the bushing to move relative to the bolt, and causes the lock member to expand radially. A shackle connection for a gas turbine engine and an aircraft are also disclosed.

13 Claims, 2 Drawing Sheets

SELF-RETAINING SHEAR PIN FOR BLIND MOUNT LOCATION

BACKGROUND OF THE INVENTION

This application relates to a shear pin which can be installed into a blind location.

Gas turbine engines are known, and are typically utilized on aircraft applications to provide propulsion for the aircraft. This is one example of where a shear pin might be utilized.

Typically, a plurality of shackles extend from a static structure on the aircraft, such as the wing, and are attached to the engine case at a plurality of locations. The locations at which the shackle is attached to the engine case typically include a shear pin that allows movement between the shackle and the engine case.

The attachment of the shear pin typically is at a "blind" location, and thus the inner end of the attachment may not be accessible to an assembler.

Proposed shear pin assemblies for use in blind locations have been unduly complex, and require a large number of parts.

SUMMARY OF THE INVENTION

In a featured embodiment, a shear pin connection for use in a difficult to access location includes a bolt having a bolt head to be positioned at an inner end of a bearing, the bolt extending outwardly through an inner bore in the bearing to an outer end. A bushing is received radially outwardly of the bolt, and between the bolt and an inner periphery of the bearing. A lock member is positioned between an inner end of the bushing and the bolt head. The lock member is radially expandable, and has a free radially outer dimension that is smaller than an inner dimension of the inner bore. The lock member us expandable to have an expanded radially outer dimension that is greater than the inner dimension of the inner bore. A nut is tightened on the outer end of the bolt. The nut causes the bushing to move relative to the bolt and causes the lock member to expand radially.

In another embodiment according to the previous embodiment, the bolt has a ramped surface for causing the lock member to be ramped radially outwardly as the nut is tightened on the bolt. The bushing and bolt move relative to each other.

In another embodiment according to any of the previous embodiments, the bushing has an inner ramped surface which is received in contact with the ramped outer surface of the bolt as the nut is fully tightened on the bolt.

In another embodiment according to any of the previous embodiments, the

In another embodiment according to any of the previous embodiments, the lock member is an expandable coil spring.

In another embodiment according to any of the previous embodiments, the expandable coil spring is received on a cylindrical surface on the bolt axially intermediate the inner end of the bushing and bolt head.

In another embodiment according to any of the previous embodiments, the inner end of the bolt will be less accessible than the outer end.

In another featured embodiment, a connection for connecting an aircraft to a gas turbine engine has an outer casing, a plurality of shackles each mounted to the outer casing through spherical bearings, and at least one shear pin connection for connecting the outer casing to one of the shackles. The shear pin connection includes a bolt having a bolt head to be positioned at an inner end of a bearing. The bolt extends outwardly through an inner bore in the bearing to an outer end. A bushing is received radially outwardly of the bolt, and between the bolt and an inner periphery of the bearing. A lock member is positioned between an inner end of the bushing and bolt head. The lock member is radially expandable, and has a free radially outer dimension that is smaller than an inner dimension of the inner bore. The lock member is expandable to have an expanded radially outer dimension that is greater than the inner dimension of the inner bore. A nut is tightened on the outer end of the bolt causing the bushing to move relative to the bolt, and cause the lock member to expand radially.

In another embodiment according to the previous embodiment, the bolt has a ramped surface for causing the lock member to be ramped radially outwardly as the nut is tightened on the bolt. The bushing and bolt move relative to each other.

In another embodiment according to any of the previous embodiments, the bushing has an inner ramped surface that is received in contact with the ramped outer surface of the bolt as the nut is fully tightened on the bolt.

In another embodiment according to any of the previous embodiments. the lock member is an expandable coil spring.

In another embodiment according to any of the previous embodiments, the expandable coil spring is received on a cylindrical surface on the bolt axially intermediate the inner end of the bushing and bolt head.

In another embodiment according to any of the previous embodiments, the inner end of the bolt will be less accessible than the outer end.

In another featured embodiment, an aircraft has an aircraft body, and a plurality of attached shackles. The plurality of shackles are mounted to a gas turbine engine outer casing through spherical bearings, with shear pins connecting the gas turbine engine casing to the shackles. At least one shear connection includes a bolt having a bolt head to be positioned at an inner end of a bearing. The bolt extends outwardly through an inner bore in the bearing to an outer end. A bushing is received radially outwardly of the bolt, and between the bolt and an inner periphery of the bearing. A lock member is positioned between an inner end of the bushing and bolt head. The lock member is radially expandable, and has a free radially outer dimension that is smaller than an inner dimension of the inner bore. The lock member is expandable to have an expanded radially outer dimension that is greater than the inner dimension of the inner bore. A nut is tightened on the outer end of the bolt. The nut causes the bushing to move relative to the bolt, and the lock member to expand radially.

In another embodiment according to the previous embodiment, the bolt has a ramped surface that causes the lock member to be ramped radially outwardly as the nut is tightened on the bolt. The bushing and bolt move relative to each other.

In another embodiment according to any of the previous embodiments, the bushing has an inner ramped surface which is received in contact with the ramped outer surface of the bolt as the nut is fully tightened on the bolt.

In another embodiment according to any of the previous embodiments, the lock member is an expandable coil spring.

In another embodiment according to any of the previous embodiments, the expandable coil spring is received on a cylindrical surface on the bolt axially intermediate the inner end of the bushing and bolt head.

In another embodiment according to any of the previous embodiments, the shackles are attached to a wing on the aircraft.

In another embodiment according to any of the previous embodiments, the inner end of the bolt will be less accessible than the outer end.

These and other features may be best understood from the following drawings and specification.

DETAILED DESCRIPTION

Figure 1:
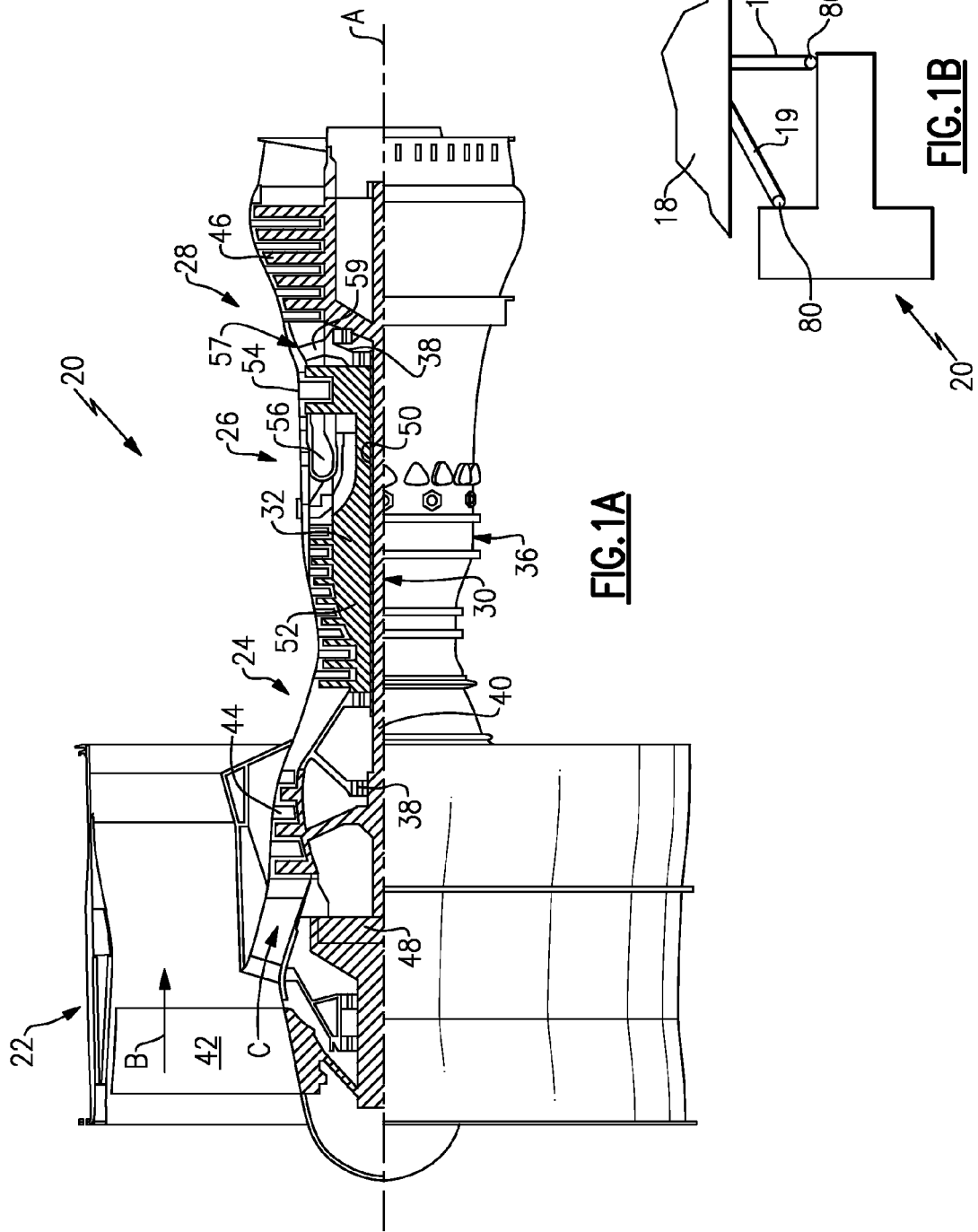
FIG. 1A schematically shows a gas turbine engine.
FIG. 1B schematically shows a mount of a gas turbine engine.

FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition —typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of 1bm of fuel being burned divided by 1bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

FIG. 1B shows the attachment of a gas turbine engine 20 to an aircraft static structure 18. Aircraft static structure 18 may be a wing, or any other location on the aircraft which is to attach the engine. As know, shackles 17 and 19 extend from static structure 18 and are connected at 80 through shear pins to a casing of the engine 20.

Figure 2:
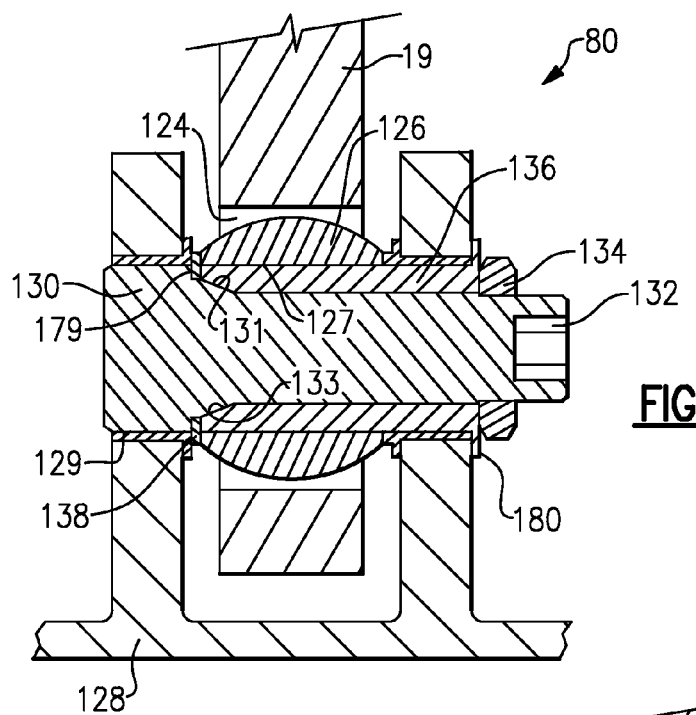
FIG. 2 shows a shear pin system mounting a shackle to an engine casing.

FIG. 2 shows one example shear pin system 80. In system 80, the shackle 19 is attached to the engine case 128 through a spherical bearing 124 and 126. This will allow adjustment of the orientation of shackle 19 relative to the engine case 128. It should be understood that the other shackle 17 may also incorporate similar structure.

A liner (to the left in this Figure) of this system is relatively inaccessible to an assembler.

A bolt 130 extends through an inner periphery 127 of the inner portion 126 of the bearing. As can be appreciated, an outer dimension of the head 129 of the bolt is slightly smaller than an inner diameter of the inner periphery 127. A bushing 136 is received on the bolt 130. A spring 138 extends radially outwardly of the inner diameter of the inner bore 127 and provides a stop preventing movement of the bolt 130 to the right as shown in the Figure. The spring 138 provides a stop member. In one embodiment, the spring may be formed of a plurality of coils, with a free outer diameter of the spring being roughly equivalent to the outer diameter of the bolt head 129, and an inner diameter of the spring being roughly equivalent to an outer diameter of the bolt at a location forward of a frustoconical surface 131. The spring is preferably a radially expandable item. In one embodiment, a coil spring having a plurality of turns is utilized.

The bolt has a ramped or frustoconical surface 131 received within a mating ramp or frustoconical surface 133 in the bushing 136. A nut 134 is threaded onto an outer end of the bolt 130. Hexagonal socket 132 provides a function which will be described below. The shear pin system 80 is assembled from the right-hand side of FIG. 2. The left-hand side is not accessible, as mentioned.

Figure 3:
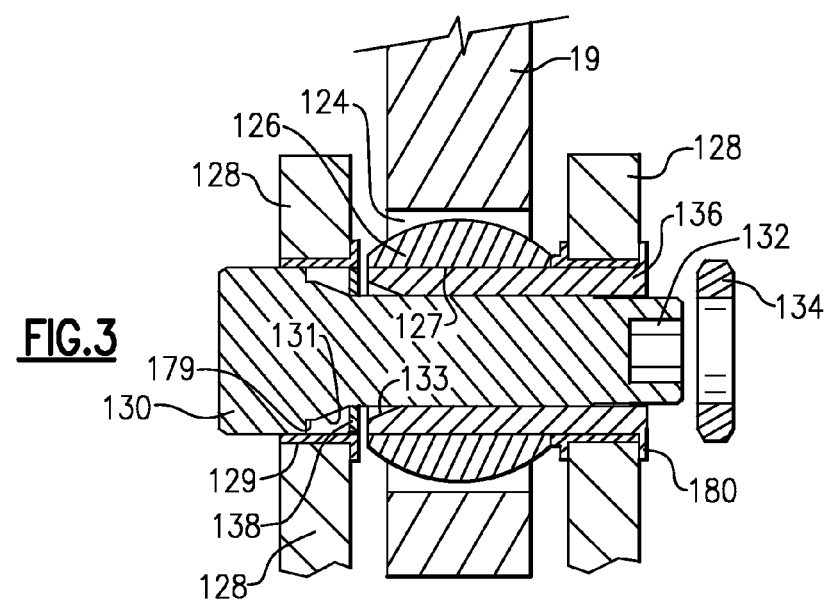
FIG. 3 shows the FIG. 2 system prior to final assembly.

When initially assembled, the nut 134 is not fully tightened on the bolt 130 as shown in FIG. 3. A sub-assembly including the bolt 130, the spring 138 and the bushing 136 are all moved within the inner periphery 127 of the spherical bearing. An outer ledge 180 of the bushing 136 abuts an outer face of the engine casing 128. As can be appreciated from FIG. 3, when initially inserted into the bearing 124/126, the bolt 130 has not been tightened, and there is a space between the ramped surfaces 131 and 133. Further, as can be seen, the spring 138 has a smaller radially outer diameter than it does in the fully assembled position of FIG. 2. Thus, the spring 138 can also move within the inner periphery 127 of the bushing inner portion 126.

Figure 4:
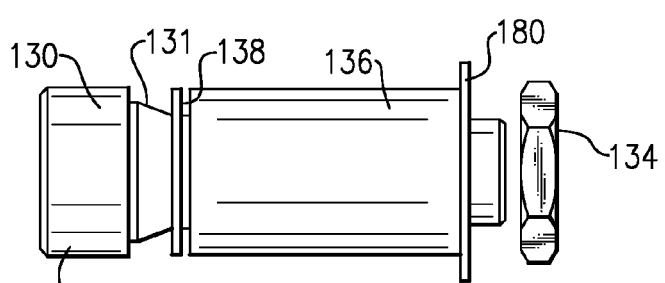
FIG. 4 shows a sub-assembly.

FIG. 4 shows the sub-assembly which may be initially moved within the inner portion 126 of the bearing.

Once this sub-assembly is received within the bearing, the nut 134 is tightened on the bolt 130. The socket 132 may be utilized to lock the bolt against rotation as this tightening occurs. As the bolt is tightened, it is drawn to the right as shown in FIG. 3, and the spring is forced radially outwardly along the surface 131, and eventually driven further by the bushing 136, which forces it along the surface 131. The spring 138 eventually snaps into a cylindrical portion 179 formed on the outer periphery of the bolt 130 just forward of the bolt head 129.

The shear pin system 80 thus allows complete assembly from an outer location of the connection of the shackle 19 to the engine casing 128. It should, of course, be understood, the same type of connection will be utilized at any number of locations to fully mount the gas turbine engine 20 to the aircraft 18.

Also, the shear pin system 80 may have application for other blind installations.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A connection for connecting an aircraft to a gas turbine engine comprising:
a gas turbine engine having an outer casing;
a plurality of shackles each mounted to said outer casing through spherical bearings, and at least one shear pin connection for connecting said outer casing to one of said shackles, said shear pin connection including a bolt having a bolt head to be positioned at an inner end of a bearing, said bolt extending outwardly through an inner bore in the bearing to an outer end, a bushing received radially outwardly of said bolt, and between said bolt and an inner periphery of the bearing, a lock member being positioned between an inner end of said bushing and said bolt head, and said lock member being radially expandable, and having a free radially outer dimension that is smaller than an inner dimension of the inner bore, and said lock member being expandable to have an expanded radially outer dimension which is greater than the inner dimension of the inner bore, and a nut to be tightened on said outer end of said bolt, said nut causing said bushing to move relative to said bolt, and cause said lock member to expand radially.

2. The connection as set forth in claim 1, wherein said bolt has a ramped surface for causing said lock member to be ramped radially outwardly as said nut is tightened on said bolt, and said bushing and said bolt move relative to each other.

3. The connection as set forth in claim 2, wherein said bushing has an inner ramped surface which is received in contact with said ramped outer surface of said bolt as said nut is fully tightened on said bolt.

4. The connection as set forth in claim 3, wherein said lock member is an expandable coil spring.

5. The connection as set forth in claim 4, wherein said expandable coil spring is received on a cylindrical surface on said bolt axially intermediate said inner end of said bushing and said bolt head.

6. The connection as set forth in claim 1, wherein said inner end of said bolt will be less accessible than said outer end.

7. An aircraft comprising:
an aircraft body, and a plurality of shackles attached to said aircraft body, said plurality of shackles mounted to a gas turbine engine outer casing through spherical bearings, with shear pins connecting said gas turbine engine casing to said shackles, and at least one said shear connection including a bolt having a bolt head to be positioned at an inner end of a bearing, said bolt extending outwardly through an inner bore in the bearing to an outer end, a bushing received radially outwardly of said bolt, and between said bolt and an inner periphery of the bearing, a lock member being positioned between an inner end of said bushing and said bolt head, and said lock member being radially expandable, and having a free radially outer dimension that is smaller than an inner dimension of the inner bore, and said lock member being expandable to have an expanded radially outer dimension which is greater than the inner dimension of the inner bore, and a nut to be tightened on said outer end of said bolt, said nut causing said bushing to move relative to said bolt, and cause said lock member to expand radially.

8. The aircraft as set forth in claim 7, wherein said bolt has a ramped surface for causing said lock member to be ramped radially outwardly as said nut is tightened on said bolt, and said bushing and said bolt move relative to each other.

9. The aircraft as set forth in claim 8, wherein said bushing has an inner ramped surface which is received in contact with said ramped outer surface of said bolt as said nut is fully tightened on said bolt.

10. The aircraft as set forth in claim 9, wherein said lock member is an expandable coil spring.

11. The aircraft as set forth in claim 10, wherein said expandable coil spring is received on a cylindrical surface on said bolt axially intermediate said inner end of said bushing and said bolt head.

12. The aircraft as set forth in claim 7, wherein said shackles are attached to a wing on said aircraft.

13. The aircraft as set forth in claim 7, wherein said inner end of said bolt will be less accessible than said outer end.

* * * * *